(12) United States Patent
Cao

(10) Patent No.: US 7,821,730 B2
(45) Date of Patent: Oct. 26, 2010

(54) SYSTEMS AND METHODS FOR COMPENSATING BASELINE WANDERING IN PERPENDICULAR MAGNETIC RECORDING

(75) Inventor: Yang Cao, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 183 days.

(21) Appl. No.: 12/233,659

(22) Filed: Sep. 19, 2008

(65) Prior Publication Data

US 2010/0073798 A1    Mar. 25, 2010

(51) Int. Cl.
*G11B 5/09* (2006.01)
(52) U.S. Cl. ............................. 360/46; 360/39; 360/65
(58) Field of Classification Search .................... None
See application file for complete search history.

(56) References Cited

U.S. PATENT DOCUMENTS

| | | | | |
|---|---|---|---|---|
| 6,404,829 B1* | 6/2002 | Sonu | ............................ | 375/345 |
| 6,775,529 B1* | 8/2004 | Roo | ............................ | 455/296 |
| 7,308,057 B1* | 12/2007 | Patapoutian | ................. | 375/350 |
| 7,426,236 B1* | 9/2008 | He | ............................... | 375/232 |
| 7,620,101 B1* | 11/2009 | Jenkins | ........................ | 375/240 |
| 2003/0026354 A1* | 2/2003 | Chang et al. | ................. | 375/316 |
| 2007/0104300 A1* | 5/2007 | Esumi et al. | ................. | 375/346 |
| 2008/0212715 A1* | 9/2008 | Chang | .......................... | 375/317 |
| 2008/0266693 A1* | 10/2008 | Bliss et al. | ..................... | 360/32 |

* cited by examiner

*Primary Examiner*—Jason C Olson
(74) *Attorney, Agent, or Firm*—Hamilton, DeSanctis & Cha

(57) ABSTRACT

Various embodiments of the present invention provide systems and methods for reducing low frequency loss in a magnetic storage device. For example, a data processing circuit is disclosed that includes a digital filter that receives a series of digital samples and provides a filtered output. The filtered output is provided to a data detector that performs a data detection on the filtered output to create a detected output. A first summation element subtracts the filtered output from the detected output to create an error signal, and a second summation element subtracts the error signal from the filtered output to create a wander basis signal. A baseline correction feedback circuit receives the wander basis signal and provides a wander compensation signal. A derivative of the wander compensation signal is provided as feedback to the digital filter.

20 Claims, 4 Drawing Sheets

SYSTEMS AND METHODS FOR COMPENSATING BASELINE WANDERING IN PERPENDICULAR MAGNETIC RECORDING

BACKGROUND OF THE INVENTION

The present inventions are related to systems and methods for transferring information, and more particularly to systems and methods for transferring information from a storage medium.

In a traditional storage device, information is longitudinally recorded on a magnetic storage medium. In a longitudinal recording scenario, data detection processes key on data transitions. As such, low frequency components (including any DC component) of the signal sensed from the magnetic storage medium do not convey information and may be eliminated. In addition, there is a desire to provide a high pass filter in a preamplifier associated with a data detection system to allow for fast write to read recovery.

In contrast to longitudinal recording where data detection keys on transitions, in newer perpendicular recording approaches the magnitude of the field sensed from the magnetic storage medium carries information. In such a case, use of a high pass filter in the preamplifier likely eliminates some information sensed from the magnetic storage medium. As disk format efficiency demands low coding overhead, the capability to provide for detecting low frequency components by means of RLL encoding is limited. In some cases, the aforementioned loss of low frequency energy has resulted in a higher bit error rate in devices using perpendicular recording approaches.

Some prior art data detection systems seek to reduce the loss of lower frequency information through use of a feedback loop. FIG. 1a depicts such a prior art data detection system 101. Data detection system 101 receives an analog input signal 106 that was previously high pass filtered by a preamplifier resulting in the removal of some low frequency information. An analog to digital converter 121 receives analog input 106 and provides a series of digital samples 126 that are provided to a finite impulse response equalizer 131. Equalizer 131 provides a filtered output 136 to a summation element 138, and the output of summation element 138 is provided to a Viterbi algorithm detector 151 which provides a detected output 196. Detected output 196 is fed back through a baseline feedback compensation circuit 171 that provides an output which is aggregated with filtered output 136 using summation element 138. In operation, baseline feedback compensation circuit 171 (e.g., a low frequency filter) provides for correction of low frequency information lost during high pass filtering. The latency of the feedback loop including Viterbi algorithm detector 151 and baseline feedback compensation circuit 171 can be significant. This latency reduces the effectiveness of any attempt to recover the lower frequency information and results in an increased bit error rate for a given input data set.

To reduce the effect of latency, some prior art data detection systems include the use of both feed forward and feedback compensation to restore some of the lower frequency information eliminated by the high pass filter. FIG. 1b depicts such a prior art data detection system 100. Data detection system 100 receives an analog input signal 105 that was previously high pass filtered by a preamplifier resulting in the removal of some low frequency information. An analog to digital converter 120 receives analog input 105 and provides a series of digital samples 125 that are provided to a finite impulse response equalizer 130. Equalizer 130 provides a filtered output 135 to a baseline feed forward compensation circuit 180. An output of baseline feed forward compensation circuit 180 is aggregated with filtered output 135 using a summation element 137. The output of summation element 137 is provided to a Viterbi algorithm detector 150 which provides a detected output 195. Detected output 195 is fed back through a baseline feedback compensation circuit 170 that provides an output which is also aggregated using summation element 137. In operation, baseline feedback compensation circuit 170 provides for correction of low frequency information lost during high pass filtering. The latency of the feedback loop including Viterbi algorithm detector 150 and baseline feedback compensation circuit 170 can be significant. To reduce the effect of such latency, baseline feed forward compensation circuit 180 provides an inverse high pass filter tuned to compensate for the upstream high pass filter removing low frequency information. This results in a non-latent attempt at low frequency information recovery that is used in addition to that provided by baseline feedback compensation circuit 170. Such an approach of using both feed forward and feedback compensation circuits provides reasonable performance, however, the feed forward compensation offers limited capability and can be very noisy.

Hence, for at least the aforementioned reasons, there exists a need in the art for advanced systems and methods for accessing information from a storage medium.

BRIEF SUMMARY OF THE INVENTION

The present inventions are related to systems and methods for transferring information, and more particularly to systems and methods for transferring information from a storage medium.

Various embodiments of the present invention provide data processing circuits. Such data processing circuits include a digital filter that receives a series of digital samples and provides a filtered output. The filtered output is provided to a data detector that performs a data detection on the filtered output to create a detected output. A first summation element subtracts the filtered output from the detected output to create an error signal, and a second summation element subtracts the error signal from the filtered output to create a wander basis signal. A baseline correction feedback circuit receives the wander basis signal and provides a wander compensation signal. A derivative of the wander compensation signal is provided as feedback to the digital filter. In some instances of the aforementioned embodiments, the digital filter is a digital finite impulse response filter, and the derivative of the wander compensation signal is operable to adjust one or more taps associated with the digital finite impulse response filter. In some instances of the aforementioned embodiments, the baseline correction feedback circuit is a low pass digital filter.

Various instances of the aforementioned embodiments further include an analog input signal that is amplified using a preamplifier. The preamplifier includes a high pass filter and provides a high pass filtered, amplified input signal. In some cases, the analog input signal is derived from a magnetic storage medium written using a perpendicular recording approach. In some such cases, low frequency information included in the analog input signal is eliminated by the high pass filtering of the preamplifier.

In particular instances of the aforementioned embodiments, the data detector is a Viterbi algorithm data detector. In other instances, the data detector is a low density parity check detector. In some cases, the circuit further includes a delay block that transfers the filtered output to the first summation element. In such cases, the latency through the delay block is approximately equivalent to the latency between the filtered output and the ideal output. Some instances of the aforementioned embodiments, further include an accumulator circuit that accumulates a plurality of the error signal and provides an accumulation signal. In such cases, a third summation element may be included that aggregates the wander compensation signal with the accumulation signal to create the derivative of the wander compensation signal. In other cases, the derivative of the wander compensation signal is simply the original wander compensation signal.

Other embodiments of the present invention provide methods for low latency baseline wandering compensation in relation to perpendicular recording data. Such methods include receiving an analog input signal; performing an analog to digital conversion of the analog input signal to create a series of digital samples; digitally filtering the series of digital samples based on a feedback signal to create a filtered digital output; performing a data detection on the filtered digital output to create a detected output; delaying the filtered digital output by a time period to create a delayed, filtered digital output; subtracting the delayed, filtered digital output from the detected output to create an error signal; subtracting the error signal from the filtered digital output to create a wander4 basis signal; and low pass filtering the wander basis signal to create a wander compensation signal. The feedback signal is a derivative of the wander compensation signal.

Some instances of the aforementioned embodiments further include accumulating a number of instances of the error signal to create an accumulation signal, and aggregating the accumulation signal and the wander compensation signal. In such instances, the derivative of the wander compensation signal is the result of aggregating the accumulation signal and the wander compensation signal. In various instances of the aforementioned embodiments, the data detection is a Viterbi algorithm data detection. In such instances, the time period is approximately equivalent to the latency associated with the Viterbi algorithm data detection. In one or more instances of the aforementioned embodiments, the analog input signal is received from a preamplifier that includes a high pass filter. In such cases, the input to the preamplifier is derived from a magnetic storage medium including information with a low frequency component stored in accordance with a perpendicular recording approach. The low frequency component is removed by the high pass filter.

Yet other embodiments of the present invention provide data storage devices. Such data storage devices include a magnetic storage medium including information stored in accordance with a perpendicular recording approach. A read/write head assembly is disposed in relation to the magnetic storage medium, and is operable to sense the information on the magnetic storage medium and to provide an analog input signal representing the sensed information. In some cases, the analog input signal includes low frequency data. A preamplifier including a high pass filter receives the analog input signal and provides an amplified input signal corresponding to the analog input signal without the low frequency data. An analog to digital converter receives the amplified input signal and provides a series of digital samples corresponding to the analog input signal. A digital filter receives the series of digital samples and provides a corresponding filtered output based on a feedback signal. The filtered output is provided to a data detector that performs a data detection on the filtered output to create a detected output. A first summation element subtracts the filtered output from the detected output to create an error signal, and a second summation element subtracts the error signal from the filtered output to create a wander basis signal. A baseline correction feedback circuit receives the wander basis signal and provides a wander compensation signal. A derivative of the wander compensation signal is provided as feedback to the digital filter. In some instances of the aforementioned embodiments, the baseline correction feedback circuit is a low pass filter, and the digital filter is a finite impulse response filter governed by at least one tap. The data storage device may further include an accumulator circuit that accumulates a plurality of the error signal, and provides an accumulation signal. A third summation element aggregates the wander compensation signal with the accumulation signal to create the derivative of the wander compensation signal. In such cases, the derivative of the wander compensation signal controls the at least one tap of the digital finite impulse response filter.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information, and more particularly to systems and methods for transferring information from a storage medium.

Various embodiments of the present invention operate to reduce bit error rate due to spectrum mismatch caused by a preamplifier incorporating a high pass filter. The preamplifier generally includes such a high pass filter to allow for fast write to read recovery. Some embodiments of the present invention utilize a baseline feedback compensation circuit that is driven by a combination of a pre-detected signal set and a post detected signal set to create a baseline compensation feedback signal. The pre-detected signal set operates as the main component in creating the baseline compensation feedback signal and does not exhibit the latency of the post detected signal set. By thus reducing the latency of the baseline compensation feedback signal, bit error rate can be reduced.

Figure 2:
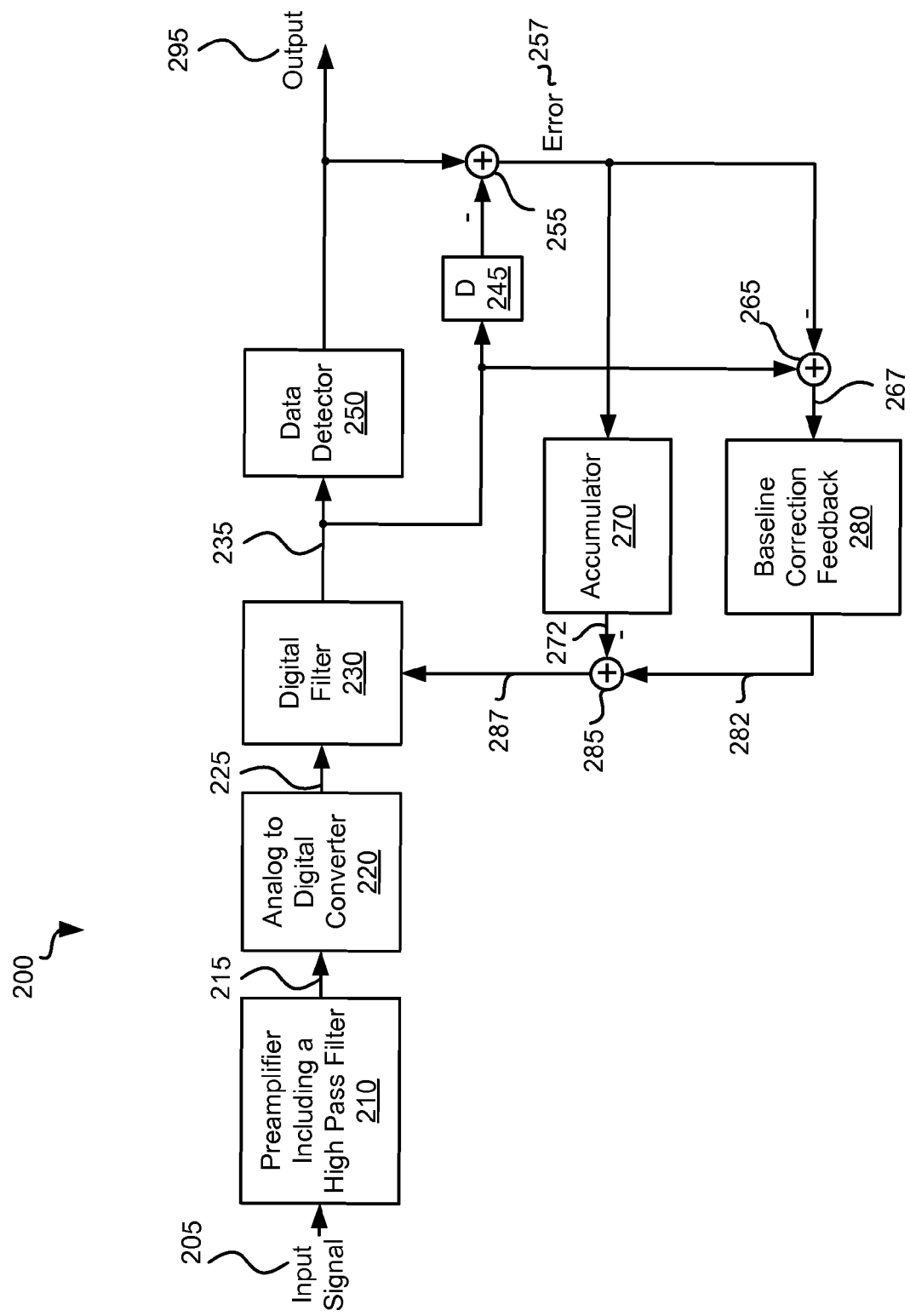
FIG. 2 depicts a data detection system including compensation designed to reduce information loss due to an upstream pre-amplification process.

Turning to FIG. 2, a data detection system 200 including compensation designed to reduce information loss due to an upstream pre-amplification process is depicted in accordance with various embodiments of the present invention. Data detection system 200 receives an analog input signal 205 derived from a magnetic storage medium (not shown) that stores information written using a perpendicular recording approach. Analog input signal 205 is provided to a preamplifier 210 that includes a high pass filter, and provides an amplified and filtered output 215. Preamplifier 210 may be any preamplifier circuit known in the art, and as such will generally include a high pass filter to allow for fast write to read recovery. The high pass filter operates to remove low frequency noise associated with input signal 205, but also removes low frequency information conveying some of the data recorded on the magnetic storage medium. Where input signal 205 includes a data sequence that has DC or very low frequency content, then the baseline will be shifted when the high pass filtering is applied. This raises the need for baseline wander compensation. Where there is no low frequency information in input signal 205, baseline wander will not be evident in the filtered input signal. Amplified and filtered output 215 is provided to an analog to digital converter 220 that converts the received analog signal into a series of digital samples 225 corresponding thereto. Analog to digital converter 220 may be any type of analog to digital converter known in the art.

Digital samples 225 are provided to a digital filter 230 that provides a filtered digital output 235. In some embodiments of the present invention, digital filter 230 is a digital finite impulse response filter as are known in the art. Based on the disclosure provided herein, one of ordinary skill in the art may recognize other types of digital filters that may be used in relation to different embodiments of the present invention. Filtered digital output 235 is provided to a data detector circuit 250 that performs a data detection algorithm on the received information and provides an ideal output 295. In one particular embodiment of the present invention, data detector circuit 250 is a Viterbi algorithm data detector as are known in the art. Based upon the disclosure provided herein, one of ordinary skill in the art will recognize other types of detectors that may be used in relation to different embodiments of the present invention, such as, for example, a low density parity check detector as are also known in the art.

Ideal output 295 is used along with filtered digital output 235 in various feedback loops. In particular, filtered digital output 235 is fed forward via a delay block 245 where the delayed version thereof is subtracted from ideal output 295 using a summation element 255. The latency associated with delay block 245 is approximately equivalent to the time required for the signal to pass through data detector circuit 250. The resulting output of summation element 255 is an error signal 257. Error signal 257 is provided to an accumulator circuit 270 which accumulates error signals as they go both positive and negative and provides an accumulated errors signal 272. In addition, error signal 257 is subtracted from filtered output 235 using a summation element 265. A wander basis signal 267 of summation element 265 is provided to a baseline correction feedback circuit 280 that provides a baseline feedback signal 282. Accumulated errors signal 272 is subtracted from baseline feedback signal 282 using a summation element 285, and an output 287 of summation element 287 is provided as feedback to digital filter 230. In one particular embodiment of the present invention, baseline correction feedback circuit 280 is a low pass filter that effectively operates to restore some of the low frequency information previously eliminated by the high pass filter associated with preamplifier 210.

Figure 1A:
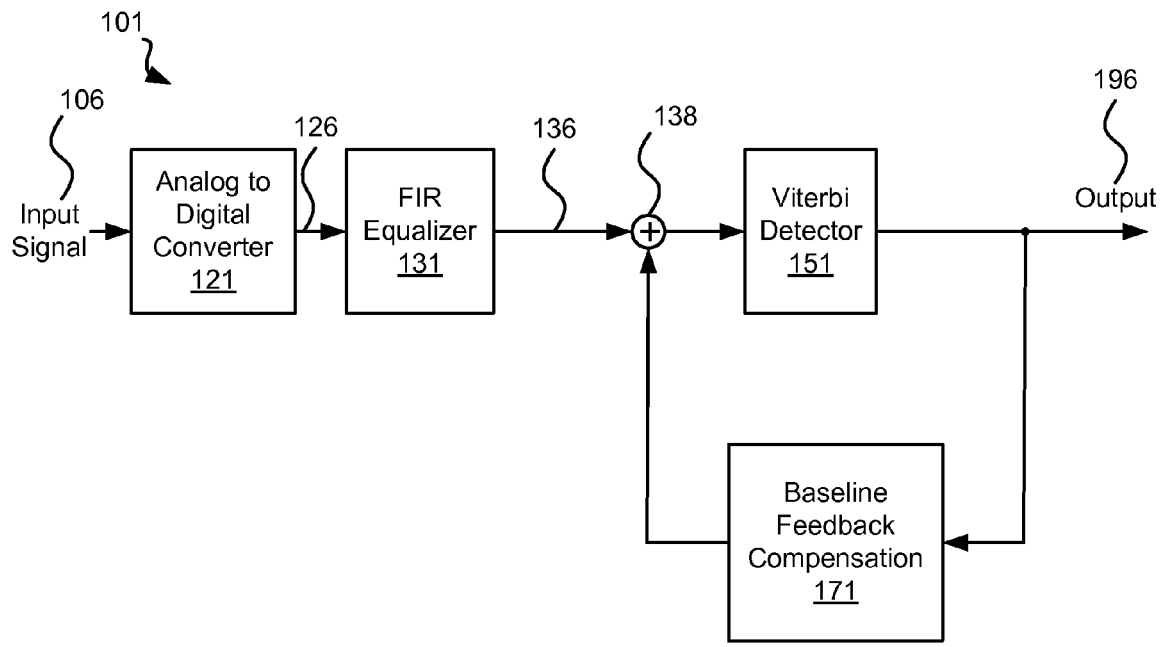
FIG. 1a depicts a prior art data detection system including feedback compensation designed to alleviate loss of low frequency information filtered by an upstream pre-amplification process.
Figure 1B:
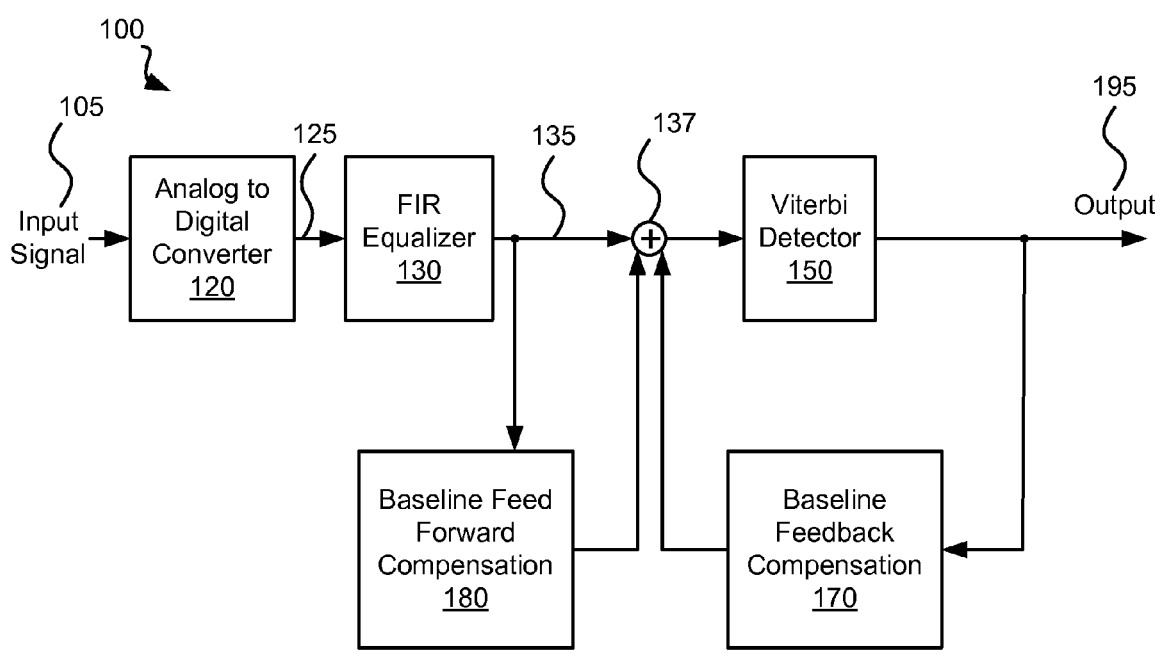
FIG. 1b depicts a prior art data detection system including both feed forward compensation and feedback compensation designed to alleviate loss of low frequency information filtered by an upstream pre-amplification process.

In this embodiment, error signal 257 exhibits the full latency of traversing data detector circuit 250. As discussed in relation to FIG. 1a and FIG. 1b, this latency limits the ability to restore low frequency information eliminated by preamplifier 210 resulting in an increased bit error rate. However, in contrast, the main component used in determining baseline feedback signal 282 is filtered digital output 235 that does not exhibit the latency of error signal 257. As such, a reasonable correction of baseline wander is achieved while eliminating the latency through data detector circuit 250. It should be noted that where baseline correction feedback circuit 280 is implemented as a low pass filter, such a low pass filter is linear. The lower latency feedback results in a reduction in bit error rate when compared with prior solutions.

Figure 3:
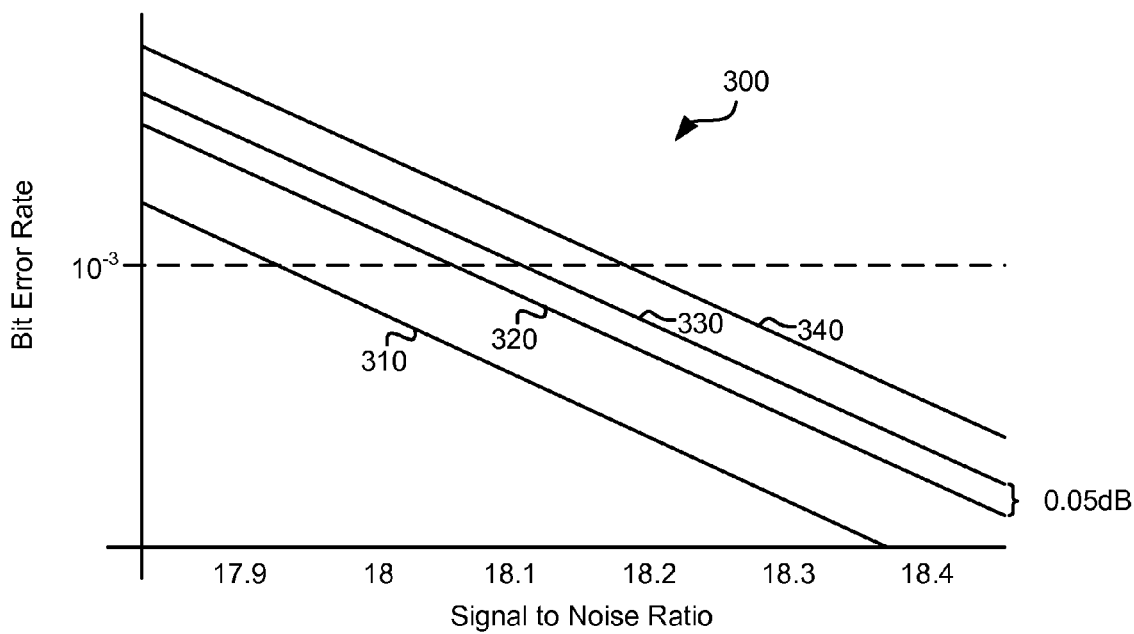
FIG. 3 graphically depicts simulation results comparing baseline wandering compensation associated with different approaches.

Turning to FIG. 3, a diagram 300 graphically depicts experimental results comparing baseline wandering compensation associated with different approaches. In particular, where the information incorporated in an input signal is pure DC, a line 310 represents the bit error rate as a function of signal to noise ratio. Similarly, when the information incorporated in an input signal is a pure AC signal, a line 340 represents the bit error rate as a function of signal to noise ratio. A line 320 represents the bit error rate as a function of signal to noise ratio for a data detection system similar to that described above in relation to FIG. 2, and a line 330 represents the bit error rate as a function of signal to noise ratio for a data detection system similar to that described above in relation to FIG. 1b. As shown, the data detection system corresponding to FIG. 2 (represented by line 320) offers a 0.05 dB improvement over that described above in relation to FIG. 1b (represented by line 330).

Figure 4:
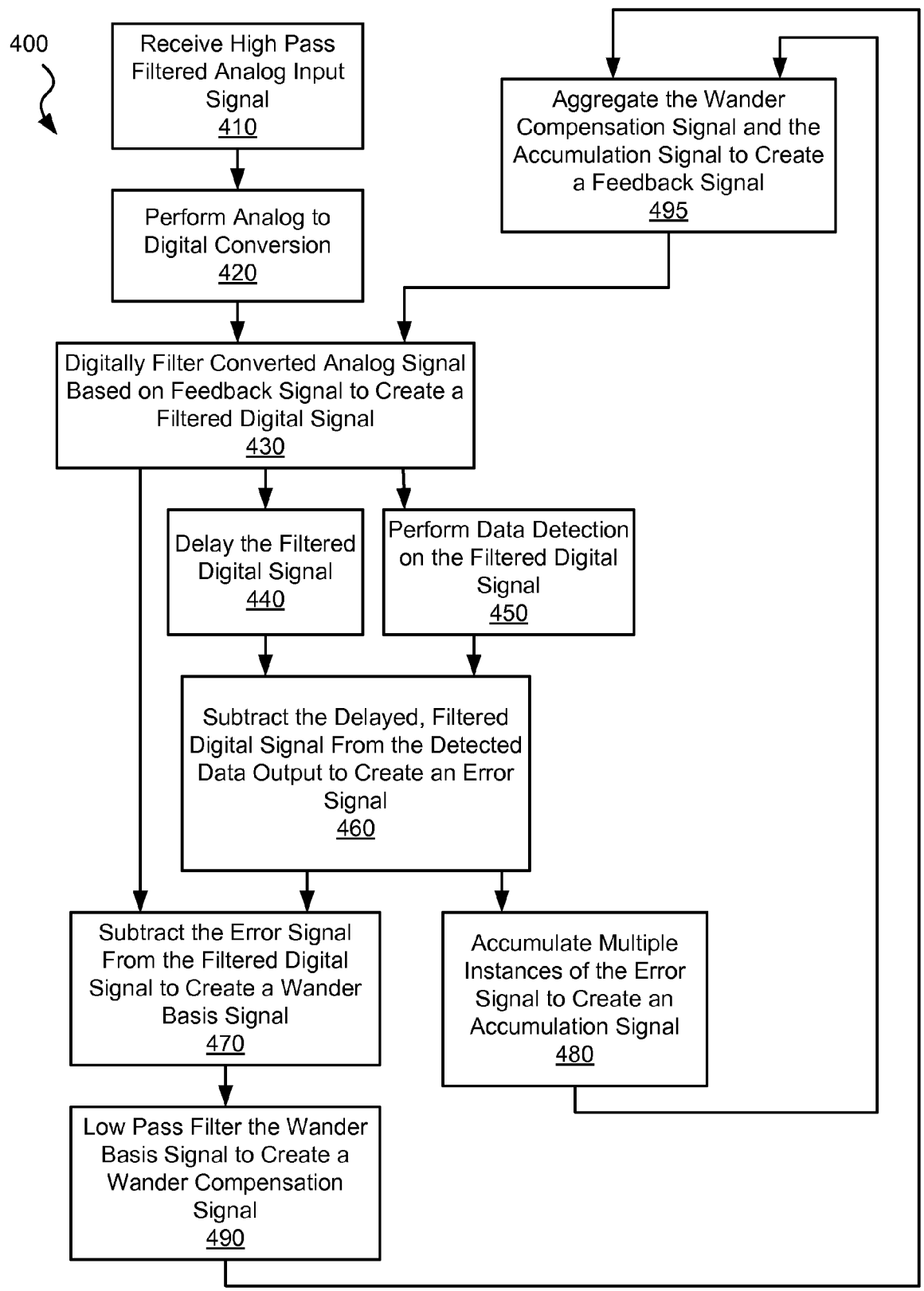
FIG. 4 is a flow diagram depicting a method in accordance with one or more embodiments of the present invention for performing baseline wander compensation.

Turning to FIG. 4, a flow diagram 400 depicts a method in accordance with one or more embodiments of the present invention for performing baseline wander compensation. Following flow diagram 400, a high pass filtered analog input signal is received (block 410). This signal may be received, for example, from a preamplifier that includes a high pass filter. In some embodiments of the present invention, the signal provided to the preamplifier is derived from a magnetic storage medium that includes information recorded in accordance with a perpendicular recording protocol. In such cases, the information may include low frequency information that may have been eliminated by the high pass filter. An analog to digital conversion is performed on the high pass filtered analog input signal (block 420). This may be done in accordance with any analog to digital conversion process known in the art.

The series of digital samples resulting from the analog to digital conversion process are digitally filtered based on a feedback signal (block 430). In one particular instance, the digital filtering is done using a finite impulse response digital filter, and the feedback signal is operable to select one or more of the taps used by the digital filter. A data detection process is performed on the filtered digital signal (block 450). The data detection process may be, but is not limited to, a Viterbi algorithm data detection process. In addition, the filtered digital signal is delayed by a time increment approximately equivalent to the latency of the data detection process to create a delayed, filtered digital signal (block 440). The delayed, filtered digital signal is subtracted from the result of the data detection to create an error signal (block 460). The error signal is accumulated across multiple samples to create an accumulation signal (block 480).

In addition, the error signal (block 460) is subtracted from the filtered digital signal to create a wander basis signal (block 470). The wander basis signal is then low pass filtered to create a wander compensation signal using a baseline correction feedback circuit (block 490). The wander compensation signal and the accumulation signal are aggregated to create the feedback signal governing operation of the digital filtering process (block 495). By using the filtered digital signal in combination with the error signal, a low latency baseline wandering correction may be achieved that exhibits a lower bit error rate than similar systems relying exclusively on feedback from a data detector.

Figure 5:
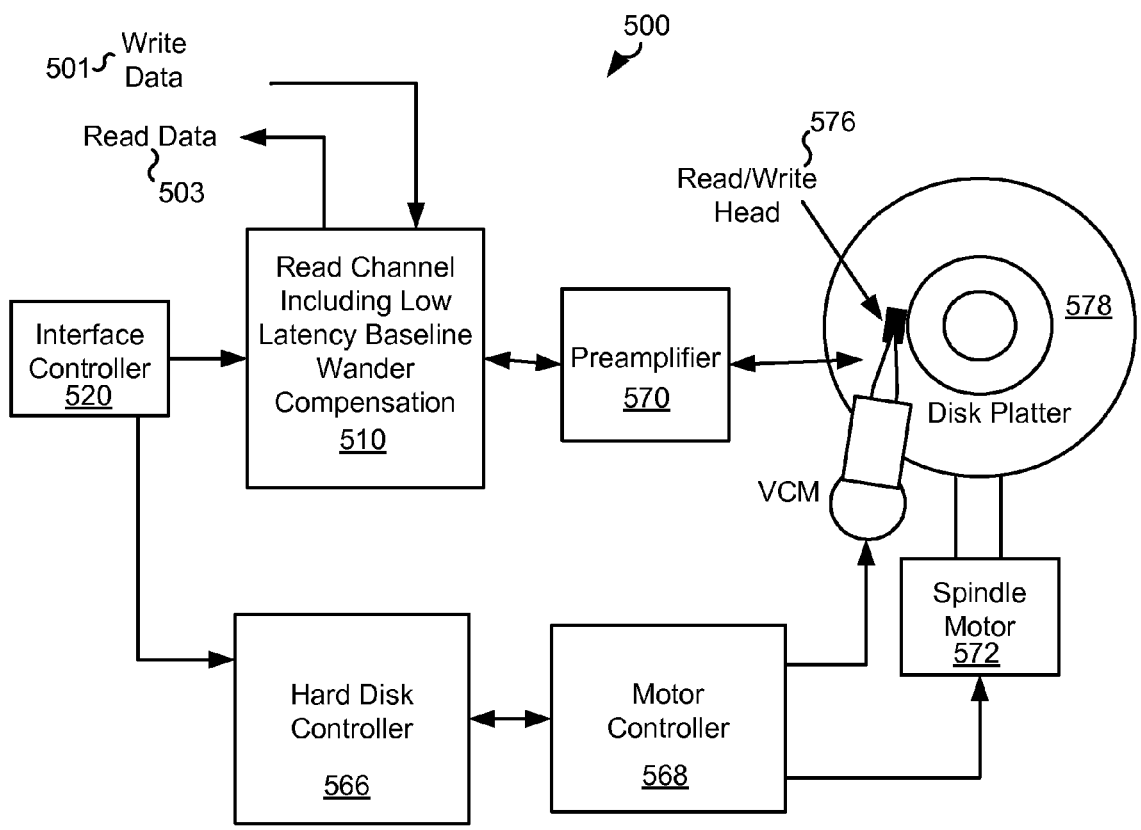
FIG. 5 shows a storage system including a read channel circuit implemented with low latency baseline wandering compensation in accordance with various embodiments of the present invention.

Turning to FIG. 5, a storage system 500 is shown including a read channel circuit 510 implemented with low latency baseline wandering compensation in accordance with various embodiments of the present invention. Storage system 500 may be, for example, a hard disk drive. Reach channel circuit 510 may incorporate a data detector, such as, for example, a Viterbi algorithm data detector. Read channel circuit 510 additionally includes a baseline feedback correction circuit using both an error signal and a filtered digital signal as discussed above in relation to FIG. 2. By using such, latency typically associated with baseline wandering compensation can be reduced, thus providing for a reduced bit error rate when compared with existing approaches. In addition to read channel circuit 510, storage system 500 includes a preamplifier 570 that may incorporate a high pass filter. The high pass filter reduces low frequency information from data received from a disk platter 578 via a read/write head 576. The The low latency baseline wander compensation incorporated in read channel circuit 510 operates to mitigate the loss of low frequency information due to high pass filtering in relation to preamplifier 570. Storage system 500 also includes an interface controller 520, a hard disk controller 566, a motor controller 568, and a spindle motor 572. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamplifier 570. Preamplifier 570 is operable to amplify the minute analog signals accessed from disk platter 578. In the process, low frequency information may be eliminated through a process of high pass filtering. In turn, read channel module 510 decodes and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

In conclusion, the invention provides novel systems, devices, methods and arrangements for reducing low frequency loss in a data detection system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, wherein the circuit comprises:
    a digital filter, wherein the digital filter receives a series of digital samples and provides a filtered output;
    a data detector, wherein the data detector receives the filtered output and performs a data detection on the filtered output to create a detected output;
    a first summation element, wherein the first summation element subtracts the filtered output from the detected output to create an error signal;
    a second summation element, wherein the second summation element subtracts the error signal from the filtered output to create a wander basis signal; and
    a baseline correction feedback circuit, wherein the baseline correction feedback circuit receives the wander basis signal and provides a wander compensation signal, and wherein a derivative of the wander compensation signal is provided as feedback to the digital filter.

2. The circuit of claim 1, wherein the digital filter is a digital finite impulse response filter.

3. The circuit of claim 2, wherein the derivative of the wander compensation signal is operable to adjust a tap of the digital finite impulse response filter.

4. The circuit of claim 1, wherein the circuit further comprises:
    an analog input signal;
    a preamplifier, wherein the preamplifier receives the analog input signal, amplifies the analog input signal, high pass filters the analog input signal, and provides an amplified input signal; and
    an analog to digital converter, wherein the analog to digital converter receives the amplified input signal and provides the series of digital samples corresponding to the amplified input signal.

5. The circuit of claim 4, wherein the analog input signal is derived from a magnetic storage medium written using a perpendicular recording approach.

6. The circuit of claim 4, wherein low frequency information included in the analog input signal is eliminated by the high pass filtering of the preamplifier.

7. The circuit of claim 1, wherein the data detector is a Viterbi algorithm data detector.

8. The circuit of claim 1, wherein the data detector is a low density parity check detector.

9. The circuit of claim 1, wherein the circuit further includes:
    a delay block that transfers the filtered output to the first summation element.

10. The circuit of claim 9, wherein the latency through the delay block is approximately equivalent to the latency between the filtered output and an ideal output.

11. The circuit of claim 1, wherein the circuit further comprises:
- an accumulator circuit, wherein the accumulator circuit accumulates a plurality of the error signal, and wherein the accumulator circuit provides an accumulation signal; and
- a third summation element, wherein the third summation element aggregates the wander compensation signal with the accumulation signal to create the derivative of the wander compensation signal.

12. The circuit of claim 1, wherein the baseline correction feedback circuit is a low pass digital filter.

13. A method for low latency baseline wandering compensation in relation to perpendicular recording data, the method comprising:
- receiving an analog input signal;
- performing an analog to digital conversion of the analog input signal to create a series of digital samples;
- digitally filtering the series of digital samples based on a feedback signal to create a filtered digital output;
- performing a data detection on the filtered digital output to create a detected output;
- delaying the filtered digital output by a time period to create a delayed, filtered digital output;
- subtracting the delayed, filtered digital output from the detected output to create an error signal;
- subtracting the error signal from the filtered digital output to create a wander basis signal; and
- low pass filtering the wander basis signal to create a wander compensation signal, wherein the feedback signal is a derivative of the wander compensation signal.

14. The method of claim 13, wherein the method further comprises:
- accumulating a number of instances of the error signal to create an accumulation signal; and
- aggregating the accumulation signal and the wander compensation signal, wherein the derivative of the wander compensation signal is the result of aggregating the accumulation signal and the wander compensation signal.

15. The method of claim 13, wherein the data detection is a Viterbi algorithm data detection.

16. The method of claim 15, wherein the time period is approximately equivalent to the latency associated with the Viterbi algorithm data detection.

17. The method of claim 13, wherein the analog input signal is received from a preamplifier that includes a high pass filter.

18. The method of claim 17, wherein the input to the preamplifier is derived from a magnetic storage medium including information with a low frequency component stored in accordance with a perpendicular recording approach, and wherein the low frequency component is removed by the high pass filter.

19. A data storage device, the data storage device comprising:
- a magnetic storage medium including information stored in accordance with a perpendicular recording approach;
- a read/write head assembly disposed in relation to the magnetic storage medium, wherein the read/write head assembly is operable to sense the information on the magnetic storage medium and to provide an analog input signal representing the sensed information, and wherein the analog input signal includes low frequency data;
- a preamplifier including a high pass filter, wherein the preamplifier receives the analog input signal and provides an amplified input signal corresponding to the analog input signal without the low frequency data;
- an analog to digital converter, wherein the analog to digital converter receives the amplified input signal and provides a series of digital samples corresponding to the analog input signal;
- a digital filter, wherein the digital filter receives the series of digital samples and provides a corresponding filtered output based on a feedback signal;
- a data detector, wherein the data detector receives the filtered output and performs a data detection on the filtered output to create a detected output;
- a first summation element, wherein the first summation element subtracts the filtered output from the detected output to create an error signal;
- a second summation element, wherein the second summation element subtracts the error signal from the filtered output to create a wander basis signal; and
- a baseline correction feedback circuit, wherein the baseline correction circuit receives the wander basis signal and provides a wander compensation signal, and wherein a derivative of the wander compensation signal is provided as feedback to the digital filter.

20. The data storage device of claim 19, wherein the baseline correction feedback circuit is a low pass filter, wherein the digital filter is a finite impulse response filter governed by at least one tap, and wherein the data storage device further includes:
- an accumulator circuit, wherein the accumulator circuit accumulates a plurality of the error signal, and wherein the accumulator circuit provides an accumulation signal;
- a third summation element, wherein the third summation element aggregates the wander compensation signal with the accumulation signal to create the derivative of the wander compensation signal; and
- wherein the derivative of the wander compensation signal controls the at least one tap of the digital finite impulse response filter.

* * * * *